United States Patent Office 3,421,250
Patented Jan. 14, 1969

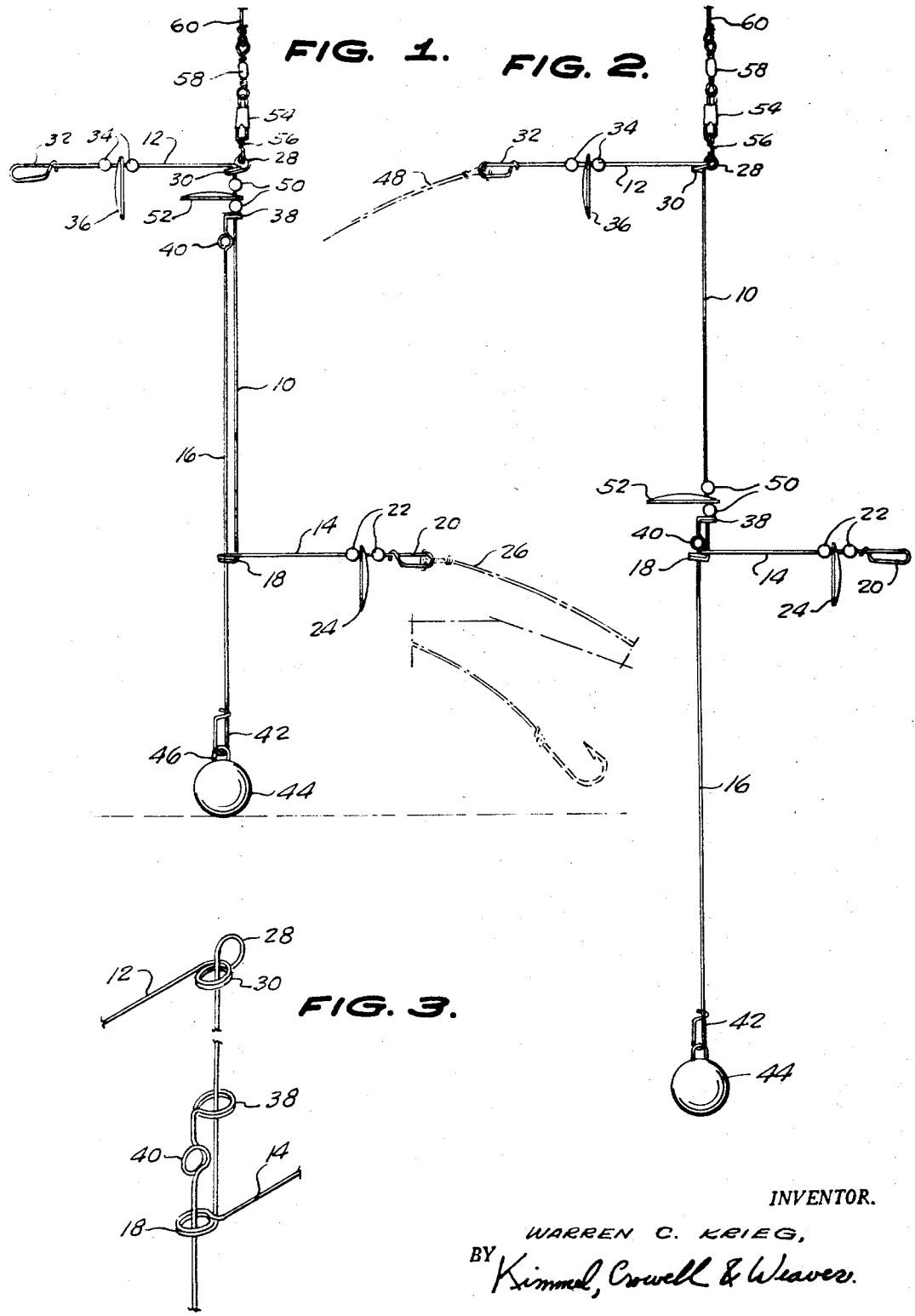

3,421,250
FISHING LURE SPREADER
Warren C. Krieg, 108 Maroy Drive,
Amherst, Ohio 44001
Filed Aug. 30, 1967, Ser. No. 664,332
U.S. Cl. 43—42.74    7 Claims
Int. Cl. A01k 91/00; A01k 83/00

ABSTRACT OF THE DISCLOSURE

A spreader for fishing lures and hooks and the like comprising a Z-shaped upper frame and a lower frame, the upper and lower frames being slidably interconnected by convolutions on the respective frames, a pair of differently directed wire leaders on the upper frame and a sinker on the lower frame for spacing fishing lures and hooks with respect to each other and with respect to the bottom of a body of water.

BACKGROUND OF THE INVENTION

Field of the invention

The invention relates to fishing lures and more particularly to spreaders for fishing hooks and lures.

Description of the prior art

It is known in the prior art to provide means for separately connecting a sinker and a hook to a common line to provide a spaced relation between the bottom of a stream and the hook or lure. Vertically movable spreaders are known, as illustrated by Patent No. 1,720,287 issued to Moore. Vertically spaced spreaders are shown in Patent Nos. 2,315,295 issued to Stogermayr and 2,352,631 issued to Guarmeri. Devices made of wire having loops and convolutions therein are known in the art and are described in Patent No. 2,506,854 issued to Brown. A double frame spreader providing an independent connection of lures or hooks in spaced relation and permitting adjustable spacing from a sinker and twirling of the hooks relative to the sinker have not heretofore been disclosed. It is, accordingly, a principle object of the present invention to provide an improved fishing lure spreader which includes means for permitting relative movement between the hooks or lures and a sinker and to permit independent movement of one of the hooks without disturbing the other.

Summary

Without intending to limit the invention, the present invention comprises a Z-shaped upper frame and a lower frame, the upper and lower frames being slidably interconnected by convolutions of wire for relative movement, the upper frame wire leaders which extend, preferably, in opposite directions. It is, an object of this invention to provide an improved fishing spreader which is so constructed and arranged as to keep the sinker in proper relation to the leaders or snells on hooks or lures and to keep the snells in proper relation with respect to each other.

A further object of the invention is to provide a spreader which includes means for preventing continuous flexing and consequent breakage of the wire of which the spreader is comprised.

Yet another object of the invention is to provide for a telescoping arrangement wherein the sinker is allowed to rest on the bottom and the spreader is allowed to be adjusted a desired distance above the bottom, whereby the action of fish is felt without being dampened by the weight of the sinker.

A further and important object of the invention is to provide for means whereby snelled hooks or lures may be held at two separate and adjustable levels.

A further object of the invention is to provide means for positioning snelled hooks by wire so that lever action on one snelled hook and wire leader does not disturb the position of the other snelled hook and wire leader.

An important object, also, of the invention is to provide for telescoping means whereby the distance of snelled hooks and wire leaders can be accurately positioned above the bottom of a body of water with the sinker resting on said bottom.

Yet another object is to provide for attractions for fish such as spinners and beads arranged so that it appears like a group of minnows.

Other objects of the invention will become apparent from the drawings and from the specification which follows, said specification and drawings constituting a specific object of the invention.

Brief description of the drawing

FIGURE 1 is a side view of the spreader of this invention shown in fully telescoped position.

FIGURE 2 is the fishing spreader of this invention shown in fully extended position.

FIGURE 3 shows in greater detail the telescopic arrangement of the spreader of this invention.

Description of the preferred embodiment

The present invention, in its exemplary and preferred form, comprises an upper wire frame including a center leg 10 and wire leaders 12 and 14 and a lower frame 16 which is telescopically secured to the upper frame.

The upper frame includes a wire leader 14 which is secured to center leg 10 by means of one or more convolutions 18, such convolutions slidably receiving the lower frame 16. A spring latch 20 is desirably formed on the end of the wire leader. A pair of decorative beads or spacers 22 and a willow or other type spinner 24 may desirably be received on the wire leader 14 for attracting fish. A snelled hook 26 is exemplary of the type of hooks and lures which may be secured to the spreader.

The upper wire leader 12 extends from the center leg 10 and is interconnected thereto by means of a loop 28, the function of which will be described hereinafter, and one or more convolutions 30 and desirably includes a resilient latch 32 on the end thereof. Of course decorative balls and a spinner 36 may be provided if desired.

The lower frame 16 includes an elongate wire portion which has one or more convolutions 38 thereon which slidably receives the center leg 10 of the upper frame. A second convolution in the lower frame shown at 40 is adapted in position for engaging the convolution 18 when the lower frame is slid downwardly to its lowermost position relative to center leg 10.

At the bottom of the lower frame, there is desirably provided a resilient latch 42 to which is secured a sinker or weight 44 held in place by means of an eye 46. The eye 46 may be in the form of a wire, the free ends of which are embedded in the body of the sinker 44.

It will be understood that an additional snelled hook or other lure 48 may be connected to the latch 32 as best shown in FIGURE 2 and, if desired, additional fish attracting balls and spinners shown at 50 and 52, respectively, may be provided on the center leg of the upper frame. This provided, they rest against and ride upon the convolution 38 as there is relative movement between the upper and lower frames.

Connection from the spreader to the fishing line is provided through the loop 28 which is connected to a snap 54 by means of a split ring 56 and through a swivel 58 to conventional fishing line 60.

Method of use

In use, a pair of snelled hooks 26 and 48 may be secured to the latches 20 and 32, respectively. The fishing spreader is then thrown or cast into the body of water and sinks towards the bottom. At it sinks towards the bottom, the upper and lower frames are fully extended as shown in FIGURE 2. It will be noted that the telescopic arrangement formed by the convolutions 18 and 38 about the upper and lower frames provides for relative rotation of the sinker and the upper frame. As the sinker reaches the bottom, telescoping occurs and the spreader appears as in FIGURE 1. It may, of course, appear in an intermediate position as well if the full length of the line is not let out.

It will be apparent that the upper frame is free to rotate and move up and down slightly according to the currents in the body of water and according to the forces exerted on the line 60. The hooks are spaced above the bottom of the body of water and may be adjusted simply by pulling in or letting out the line 60.

It is important to note, also, that since the sinker is resting on the bottom, the action of a fish nibbling or taking one of the hooks is transmitted by a lever action through the wire leader 14 or 12, as the case may be to the line 60. The action of the fish is transmitted fully to the line 60 and may be felt by the fisherman without being damped by the weight of the sinker. Further, it will be understood that the lever action of one of the hooks caused by the force exerted by fish nibbling or taking the hook is transmitted only to the line 60 through the center leg 10 and does not effect the position of the other wire leader.

Since each of the wire leaders and all of the portions of the upper and lower frames are interconnected by one or more convolutions of wire, constant bending and flexing of the wire at a given point is avoided and, consequently, there is less likelihood of breakage of the wire due to metal fatigue.

It will be understood, that according to practice, the spirit of this invention will be made of thin comparatively rigid wire to provide the necessary spacing. The balls are desirably of a red or orange color and may be fluorescent for attracting fish. Willow spinners or other type spoons may be used if desired.

Because of the configuration of the spreader, a proper relation is maintained between the hooks and an adjustable relation is maintained between the hooks and the bottom of the body of water, upon which the sinker rests. This combination of spacing and adjustability constitutes an important feature of the invention.

I claim:

1. A fishing lure spreader which is combination comprises:
    an upper wire frame which includes two differently directed wire leaders;
    a lower wire frame which is slidably interconnected with the upper wire frame for reciprocable movement relative thereto; and
    means for securing a sinker to the bottom portion of the lower wire frame.

2. The spreader of claim 1 wherein the upper wire frame comprises a generally Z shaped member, the upper and lower extension thereof comprising the wre leaders and the center leg member is slidably interconnected with the lower wire frame for relative movement therewith.

3. The spreader of claim 2 wherein the upper frame and the lower frame are slidably interconnected by at least one convolution of wire on the lower frame wrapped about the center leg of the upper frame and at least one convolution of wire on the upper frame wrapped about the lower frame, said convolutions slidably receiving the respective frames.

4. The spreader of claim 3 further comprising:
    at least one volution of the wire in the lower frame between the first named convoltions for engaging the convolution on the upper frame for limiting reciprocable relative movement of the upper and lower frames.

5. The spreader of claim 4 further comprising:
    a loop and a convolution in the upper frame interconnecting an upper wire leader to the center leg, said loop being adapted for being connected to a fishing line.

6. The spreader of claim 5 further comprising:
    a resilient latch formed on the end of each of the wire leaders.

7. The spreader of claim 5 wherein the first named convolution on the upper frame forms the interconnection between the center leg and a lower wire leader thereof.

References Cited

UNITED STATES PATENTS

| | | | |
|---|---|---|---|
| 1,720,287 | 7/1929 | Moore | 43—44.85 |
| 2,170,788 | 8/1939 | Augenblick | 43—42.74 |
| 2,315,295 | 3/1943 | Stogermayr | 43—42.74 |
| 2,506,854 | 5/1950 | Brown | 43—44.98 |
| 2,665,903 | 1/1954 | Green | 43—42.72 X |
| 2,708,804 | 5/1955 | Kucklick | 43—42.74 X |

FOREIGN PATENTS 986,156   3/1951   France.

SAMUEL KOREN, *Primary Examiner.*

DANIEL J. LEACH, *Assistant Examiner.*

U.S. Cl. X.R.

43—44.84